US008069081B2

(12) United States Patent
Neufeld et al.

(10) Patent No.: US 8,069,081 B2
(45) Date of Patent: Nov. 29, 2011

(54) TARGETED ADVERTISING USING OBJECT IDENTIFICATION

(75) Inventors: Nadav M. Neufeld, Sunnyvale, CA (US); Gionata Mettifogo, Menlo Park, CA (US); Charles Migos, San Francisco, CA (US)

(73) Assignee: Microsoft Corporation, Redmond, WA (US)

(*) Notice: Subject to any disclaimer, the term of this patent is extended or adjusted under 35 U.S.C. 154(b) by 446 days.

(21) Appl. No.: 12/236,215

(22) Filed: Sep. 23, 2008

(65) Prior Publication Data
US 2010/0076828 A1 Mar. 25, 2010

(51) Int. Cl.
*G06Q 30/00* (2006.01)
(52) U.S. Cl. .................... 705/14.49; 345/175
(58) Field of Classification Search .............. 705/14, 705/14.49
See application file for complete search history.

(56) References Cited

U.S. PATENT DOCUMENTS

| | | | |
|---|---|---|---|
| 5,951,397 A * | 9/1999 | Dickinson ................. 463/36 |
| 6,208,387 B1 | 3/2001 | Magnusson et al. |
| 6,401,074 B1 * | 6/2002 | Sleeper ................. 705/14.65 |
| 6,484,148 B1 | 11/2002 | Boyd |
| 6,697,103 B1 | 2/2004 | Fernandez et al. |
| 6,708,176 B2 * | 3/2004 | Strunk et al. ................. 1/1 |
| 7,808,540 B2 * | 10/2010 | Cok ................. 348/333.01 |
| 2002/0019784 A1 * | 2/2002 | Ritz ................. 705/26 |
| 2002/0111994 A1 * | 8/2002 | Raghunandan ............. 709/203 |
| 2002/0125324 A1 * | 9/2002 | Yavid et al. ............. 235/462.45 |
| 2002/0145038 A1 * | 10/2002 | O'Hagan et al. ............. 235/383 |
| 2002/0190919 A1 * | 12/2002 | Lee ................. 345/1.3 |
| 2003/0078840 A1 * | 4/2003 | Strunk et al. ................. 705/14 |
| 2003/0132298 A1 * | 7/2003 | Swartz et al. ............. 235/472.02 |
| 2004/0064368 A1 * | 4/2004 | Koser et al. ................. 705/14 |
| 2004/0218837 A1 | 11/2004 | Shiyama |
| 2005/0018216 A1 | 1/2005 | Barsness et al. |
| 2005/0187819 A1 * | 8/2005 | Johnson ................. 705/14 |
| 2006/0095324 A1 * | 5/2006 | Vergeyle et al. ................. 705/14 |
| 2007/0113243 A1 | 5/2007 | Brey |
| 2007/0266185 A1 | 11/2007 | Goddi et al. |
| 2008/0068622 A1 | 3/2008 | Deng et al. |
| 2008/0167913 A1 | 7/2008 | Wiswell et al. |
| 2008/0172781 A1 | 7/2008 | Popowich et al. |
| 2009/0102763 A1 * | 4/2009 | Border et al. ................. 345/87 |
| 2009/0322706 A1 * | 12/2009 | Austin ................. 345/175 |
| 2011/0058084 A1 * | 3/2011 | Hine et al. ................. 348/333.1 |

OTHER PUBLICATIONS

"Moving Beyond SMS: Moving Beyond the SMS." Brand Strategy, Apr. 8, 2008.*
Moses, Lucia. "Off the page: how print players are using mobile to reach readers and advertisers on the move." Media Week, Feb. 25, 2008.*
Kim, Ryan. "Bar codes unlock world of information," San Francisco Chronicle, Mar. 27, 2008.*
Morrissey, Brian. "How cell phones bridge old and new media: interactive bar and text codes help marketers measure effectiveness of traditional ads," Adweek, Feb. 25, 2008.*
Block, Debbie Galante. "Cracking the code: Sprint, Scanbuy team up to test latest mobile marketing technology." Billboard, Oct. 27, 2007.*
Frazier, Mya. "From porn shops to your pocket; Scanbuy could redefine mobile marketing—if it gets out of the XXX stores." Advertising Age, Feb. 27, 2006.*
"Cool 2 Use," Newsday, Sep. 19, 2005.*

(Continued)

*Primary Examiner* — Michelle Tarae (57) ABSTRACT

Targeted advertising using object identification techniques is described. In an implementation, an object is identified by a client that is placed on a surface of the client. An advertisement is located that corresponds to the identified object and is output.

18 Claims, 5 Drawing Sheets

OTHER PUBLICATIONS

Heingartner, Douglas. "Connecting Paper and Online Worlds by Cellphone Camera," New York Times, Oct. 7, 2004.*

Van et al. "Michigan Sales Tax Does Not Apply to Property Sold Incidental to a Service," Tax Executive, Jul./Aug. 2004.*

Clapperton, Guy. "Business Solutions: Mobile Working: The way we'll work: Bright ideas or fanciful failures," The Guardian, Apr. 29, 2004.*

"Scanbuy and Telefonica Moviles Espana to Launch Solution Allowing Widespread Use of Barcodes with Mobile Handsets in Spain," PR Newsire, Apr. 10, 2007.*

Muhtar, Fauziah. "Browsing without touching," New Straits Times, May 5, 2005.*

Muhtar, Fauziah. "Digital Broadcasting with new iCats systems," New Straits Times, May 27, 2004.*

"Paymentech and Hypercom Expedite Availability of Hypercom's Value-Added Epic Applications to ISOs," Business Wire, Mar. 8, 2001.*

"MobiNetix's New Developer's Software Provides First Visual Design for Interactive Electronic-Transaction Applications," Business Wire, Jun. 15, 1998.*

Murph, Darren, "Microsoft Envisions Invasive Approach to Targeted Advertising", Retrieved at <<http://www.engadget.com/2007/07/31/microsoft-envisions-invasive-approach-to-targeted-advertising/>>, Jul. 31, 2007, pp. 3.

"Microsoft Unveils Coffee Table PC", Retrieved at <<http://www.e-consultancy.com/news-blog/363438/microsoft-unveils-coffee-table-pc.html>>, Aug. 1, 2008, pp. 3.

"Microsoft's Surface Tables Installed at Las Vegas Casino", Retrieved at <<http://www.foxnews.com/story/0,2933,366150,00.html>>, Jun. 13, 2008, pp. 3.

"PCT Search Report", Application Serial No. PCT/US2009/057878, (May 11, 2010),11 pages.

* cited by examiner

TARGETED ADVERTISING USING OBJECT IDENTIFICATION

BACKGROUND

Advertisements continue to be used to financially support provision of the content. However, output of advertisements is still traditionally linked to the content that is output with the advertisements and not to other factors that might exist "outside" of the content.

For example, advertisements for sporting goods might be included with a sporting event to increase a likelihood that the advertisement will reach a target consumer. However, in traditional techniques the advertiser has little to no information about the actual audience. Instead, the advertiser is forced to rely on general data collection techniques (e.g., polling techniques) to determine generalized characteristics of an audience that has watched the content or similar content in the past.

Thus, traditional advertising techniques leave the advertiser to make a "best guess" as to an audience that will interact with particular content, e.g., watch a television program, view a webpage, and so on. These traditional techniques also leave the advertiser to guess whether that audience has an increased likelihood of being a potential consumer for a product or service offered by the advertiser. Accordingly, traditional techniques may be inefficient as advertisers may have increased difficulty in reaching a target audience, consumers may be less likely to receive relevant advertisements, and content providers may lose revenue due to uncertainty of the audience.

SUMMARY

Targeted advertising using object identification techniques is described. In an implementation, an object is identified by a client that is placed on a surface of the client. An advertisement is located that corresponds to the identified object and is output.

In one or more implementations, each of a plurality of objects is identified that have been placed on a surface of a client. An identity is stored of each of the plurality of objects. Output is targeted of one or more advertisements that correspond to the stored identities.

In one or more implementations, a client includes a surface to display content and one or more modules. The one or more modules are configured to cause an image to be displayed on the surface, identify one or more objects placed on the surface, and target output of one or more advertisements to correspond to the identified one or more objects.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

In traditional advertising techniques, an advertiser has little to no information about the actual audience. Therefore, traditional advertising techniques left the advertiser to make a "best guess" as to an audience that will interact with particular content, e.g., watch a television program, view a webpage, and so on. Accordingly, these traditional techniques may be inefficient as advertisers may have increased difficulty in reaching a target audience, consumers may be less likely to receive relevant advertisements that are of interest to the consumers, and content providers may lose revenue due to uncertainty of the audience.

Targeted advertising using object identification techniques is described. In an implementation, output of advertisements is based on one or more objects that are placed on a surface of a client. For example, the client may be configured to follow a form function of a table. The client may also include functionality to determine what objects are placed on a surface of the table, e.g., a table top. Identification of particular objects that have been placed on the surface may then be used to target advertisements. For instance, a set of car keys for a particular brand of car may be used to target advertisements that relate to that brand of car. These advertisements may be output in a variety of ways, such as by using the surface itself, using another client located locally to the client (e.g., a television), and so on. In this way, an advertiser may target an audience having an increased likelihood of being interested in the advertisements.

In the following discussion, an example environment is first described that is operable to perform one or more techniques to target advertising using object identification. Example procedures are then described which may be implemented using the example environment as well as other environments. Accordingly, implementation of the procedures is not limited to the example environment and the example environment is not limited to implementation of the example procedures.

EXAMPLE ENVIRONMENT

Figure 1:
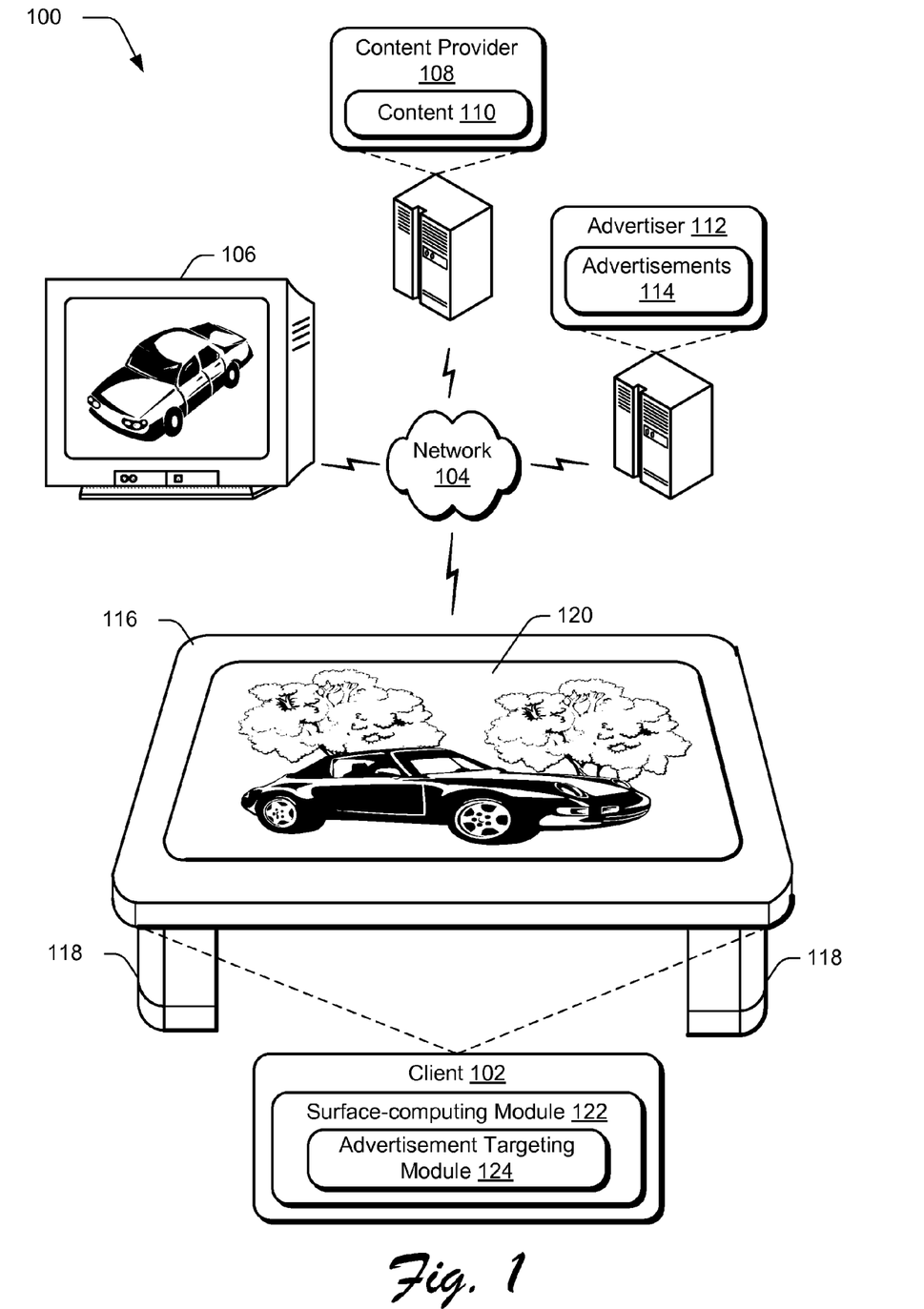
FIG. 1 is an illustration of an environment in an example implementation that is operable to target advertisements using object identification.

FIG. 1 is an illustration of an environment 100 in an example implementation that is operable to employ techniques to target advertising using object identification. The illustrated environment 100 includes a client 102 that is communicatively coupled via a network 104 to another client 106 configured as a television, a content provider 108 having content 110, and an advertiser 112 having one or more advertisements 114.

The client 102 may be configured in a variety of ways. For example, the client 102 may be configured as a computer that is capable of communicating over the network 104, such as a desktop computer, a mobile station, an entertainment appliance, a set-top box communicatively coupled to a display device, a wireless phone, a game console, and so forth. Thus, the client 102 may range from full resource devices with substantial memory and processor resources (e.g., personal computers, game consoles) to a low-resource device with limited memory and/or processing resources (e.g., traditional set-top boxes, hand-held game consoles). The client 102 may also relate to a person and/or entity that operate the client. In other words, client 102 may describe a logical client that includes software and/or computing devices.

Although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks. For instance, the client 102 and the other client 106 may be communicatively coupled via a local network connection, one to another. Additionally, the client 102 may be communicatively coupled to the content provider 108 over the Internet. Likewise, the advertiser 112 may be communicatively coupled to the content provider 108 via the Internet. A wide variety of other instances are also contemplated.

In the illustrated environment 100, the client 102 is illustrated as having a form factor of a table. The table form factor includes a housing 116 having a plurality of legs 118. The housing 116 includes a table top having a surface 120 that is configured to display one or more images, such as the car as illustrated in FIG. 1.

The client 102 is further illustrated as including a surface-computing module 122. The surface-computing module 122 is representative of functionality of the client 102 to provide computing related functionality that leverages the surface 120. For example, the surface computing module 122 may be configured to output a user interface via the service 120. The surface-computing module 122 may also be configured to detect interaction with the surface 120, and consequently the user interface. Accordingly, a user may then interact with the user interface via the surface 120 in a variety of ways.

For example, the user may use one or more fingers as a cursor control device by touching the surface 120, as a paintbrush, to manipulate images (e.g., to resize and move the images), to transfer files (e.g., between the client 102 and another client 106), to obtain content 110 via the network 104 by Internet browsing, to interact with another client 106 that is local to the client 102 (e.g., to select content to be output by the other client 106), and so on. Thus, the surface computing module 122 of the client 102 may leverage the surface 120 in a variety of different ways both as an output device and an input device, further discussion of which may be found in relation to FIG. 2.

The client 102 is also illustrated as having an advertisement targeting module 124. The advertisement targeting module 124 is representative of functionality of the client 102 to provide targeted advertising using object identification. For example, as previously described the surface computing module 122 may act in conjunction with the surface 120 as an input device. Accordingly, objects placed on the surface 120 may be detected by the surface computing module 122. These objects may then be identified by the advertisement targeting module 124 and used to select one or more advertisements 114 that have an increased likelihood of being relevant to a user that placed the object on the surface 120. In this way, the advertisement targeting module 124 may provide opportunities to the advertiser 112 that are targeted to particular users that placed the objects on the surface 120, further discussion of which may be found in relation to the following figure.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the surface techniques described below are platform-independent, meaning that the techniques may be implemented on a variety of commercial computing platforms having a variety of processors.

Figure 2:
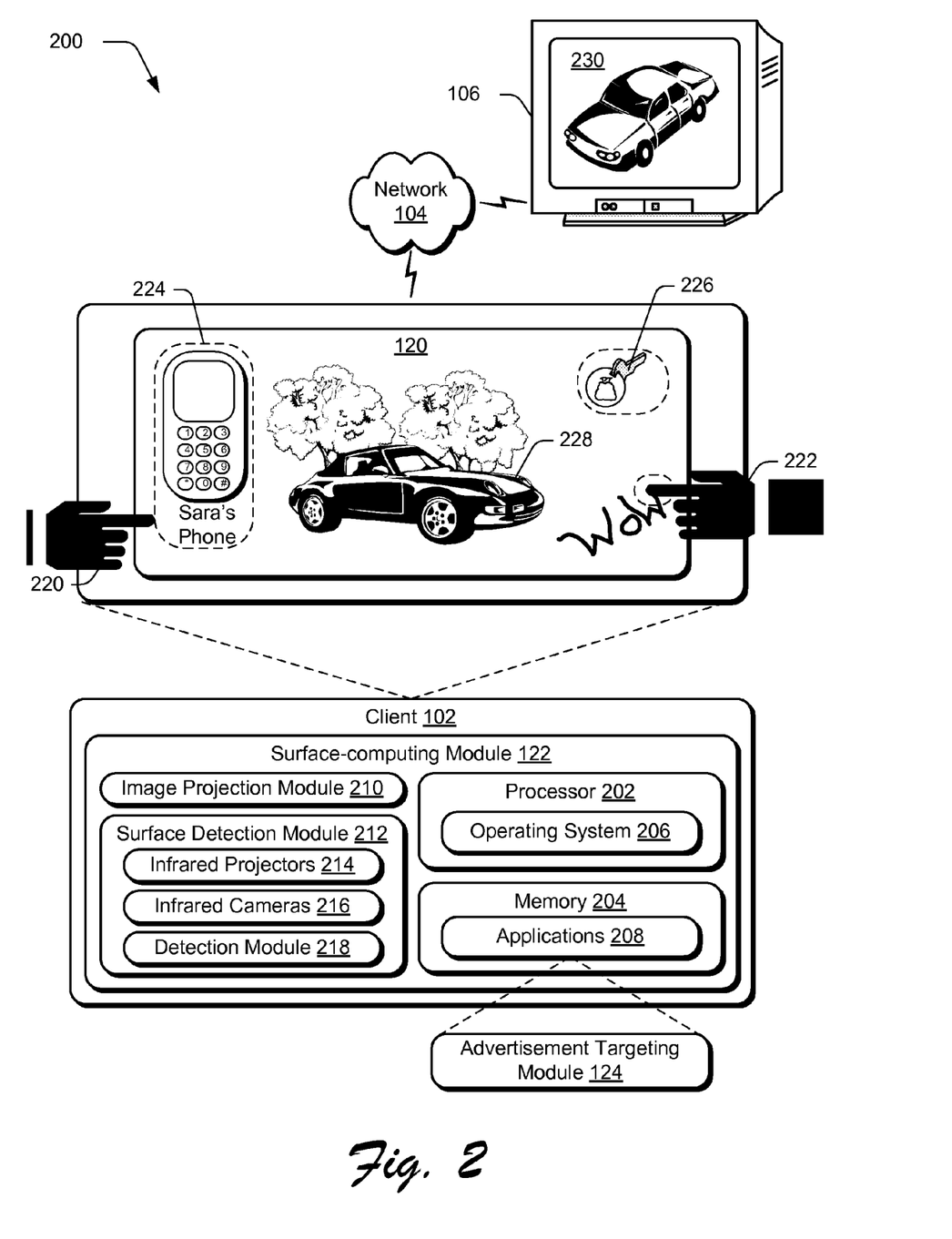
FIG. 2 is an illustration of a system in an example implementation showing a client of FIG. 1 in greater detail.

FIG. 2 depicts a system 200 in an example implementation showing the client 102 of FIG. 1 in greater detail. The client 102 includes the surface computing module 122 of FIG. 1, which in this instance is illustrated as including a processor 202 and memory 204. Processors are not limited by the materials from which they are formed or the processing mechanisms employed therein.

For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 204 is shown, a wide variety of types and combinations of memory may be employed, such as random access memory (RAM), hard disk memory, removable medium memory, and other types of computer-readable media.

The client 102 is illustrated as executing an operating system 206 on the processor 202, the operating system 206 also storable in memory 204. The operating system 206 is executable to abstract hardware and software functionality of the underlying client 102, such as to one or more applications 208 that are illustrated as stored in memory 204. In this system 200 of FIG. 2, the advertisement targeting module 124 is illustrated as one of the applications 208 that are stored in memory 204 of the client 102, e.g., the advertisement targeting module 124 is an executable module in the illustrated instance.

The surface computing module 122 is also illustrated as including an image projection module 210 and a surface detection module 212. The image projection module 210 is representative of functionality of the client 102 to display an image onto the surface 120. A variety of different techniques may be employed by the image projection module 210 to project the image, such as through use of a rear projection system, a LCD, and so on.

The surface detection module 212 is representative of functionality of the client 102 to detect one or more objects when placed proximally to the surface 120. The surface detection module 212 may employ a variety of different techniques to perform this detection, such as radio frequency identification (RF ID), image recognition, barcode scanning, optical character recognition, and so on.

For example, the surface detection module 212 of FIG. 2 is illustrated as including one or more infrared projectors 214, one or more infrared cameras 216, and a detection module 218. The one or more infrared projectors 214 are configured to project infrared and/or near infrared light on to the surface 120. The one or more infrared cameras 216 may then be configured to capture images of the reflected infrared light output by the infrared projectors 214.

For instance, objects such as fingers of respective users' hands 220, 222, a user's phone 224, and keys 226 are visible by the infrared cameras 216 through the surface 120. In the illustrated instance, the infrared cameras 216 are placed on an opposing side of the surface 120 from the users' hands 220, 222, e.g., within a housing of the client 102. The detection module 218 may then analyze the images captured by the infrared cameras 216 to detect objects that are placed on the surface 120. An output of this analysis may then be provided to the operating system 206, the applications 208, and so on.

In an implementation, the surface detection module 212 may detect multiple objects at a single point in time. For example, the fingers of the respective users' hands 220, 222 may be detected for interaction with a user interface output by the operating system 206. In this way, the client 102 may support simultaneous interaction with multiple users.

The client 102 may also support gestures, which may be used to interact with the user interface. For example, different gestures may be used to expand an image, rotate an image, move files between devices, select output of a particular item of content, and so on. Although detection using image capture has been described, a variety of other techniques may also be employed by the surface computing module 122, and more particularly the surface detection module 212, to detect objects placed on or proximate to the surface 120 of the client 102, such as RFID, "sounding" techniques (e.g., ultrasonic techniques similar to radar), biometric (e.g., temperature), and so on. A variety of other techniques are also contemplated that may be used to leverage interaction with the surface 120 of the client 102 without departing from the spirit and scope thereof.

In an implementation, the advertisement targeting module 124 may leverage detection of objects on the surface 120 of the client 102. For example, a user may place keys 226 on the surface 120. The keys 226 may then be detected by the surface detection module 212, which may then output an indication that that keys 226 have been detected to the advertisement targeting module 124. This indication may be configured in a variety of ways, such as a numerical identifier that is unique to a brand of the keys 226, an image of the keys 226 for further processing by the advertisement targeting module 124, and so on.

The advertisement targeting module 124 may then identify the object placed on a surface 120 and use this identification as a basis for targeting advertisements. Continuing with the previous example, the advertisement targeting module 124 may identify a particular brand associated with the keys 226 and output an advertisement corresponding to that brand via the surface 120. An example of this is illustrated in FIG. 2 as an image of a car 228 output by the image projection module 210 on a surface 120. In another example, the targeted advertisement may be output by another client, such as an advertisement 230 of a car output by the other client 106 that is communicatively coupled to the client 102 via the network 104. A variety of other examples are also contemplated, further discussion of which may be found in relation to the following figures.

EXAMPLE PROCEDURES

The following discussion describes surface-computing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
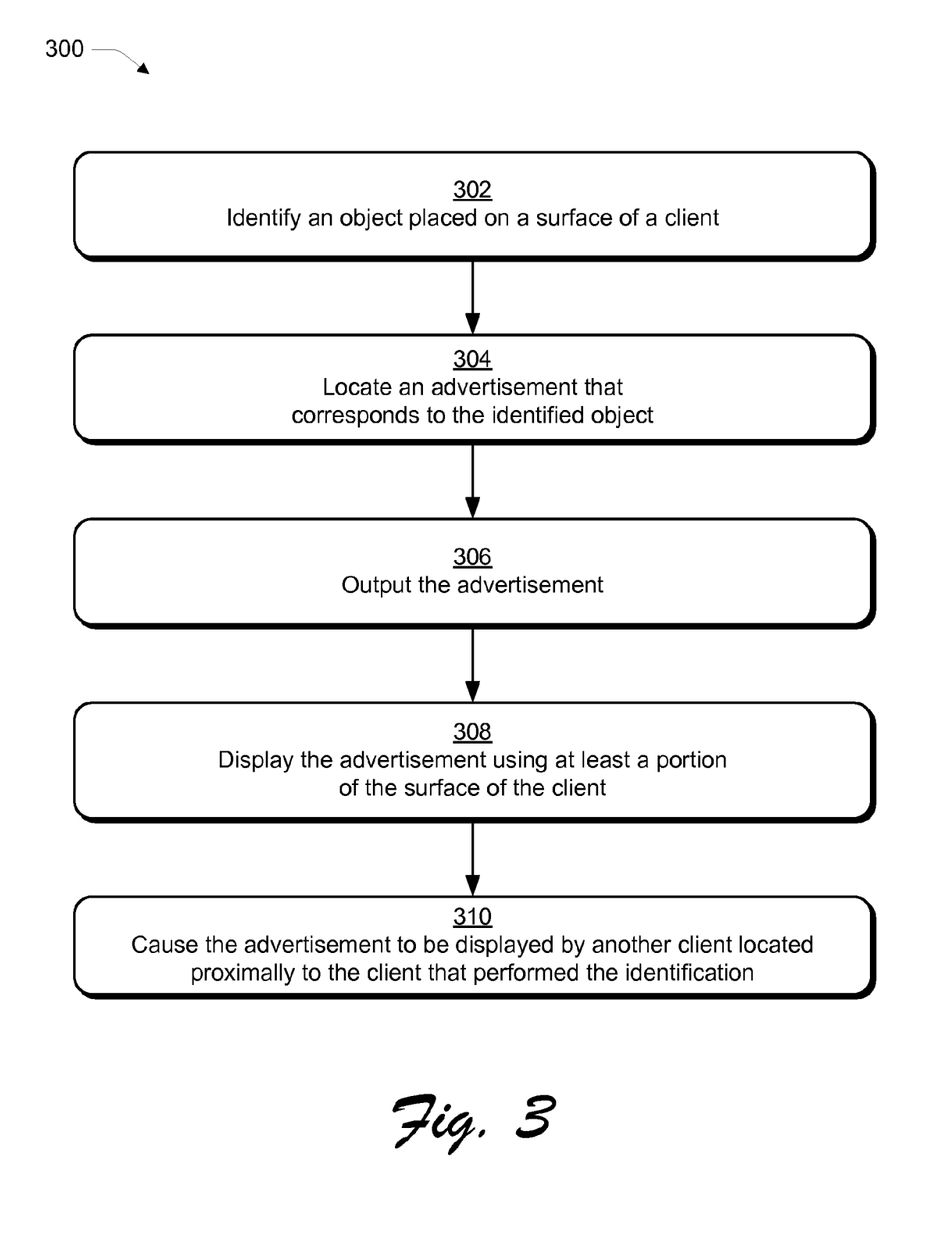
FIG. 3 is a flow diagram depicting a procedure in an example implementation in which an advertisement is output based on an identification of an object on a surface of a client.

FIG. 3 depicts a procedure 300 in an example implementation in which an advertisement is output based on an identification of an object on a surface of a client. An object is identified that is placed on a surface of a client (block 302). For example, the client 102 can be configured according to a form factor of a table such that the surface 120 of the client 102 is approximately horizontal. Accordingly, the client 102 may be encountered in a wide variety of environments, such as a coffee table in the user's household, in a retail store, in a lobby of a building, and so on. Further, because the surface 120 is horizontal a variety of different objects may be placed on the surface 120, such as a phone 224 or keys 226 as previously described in relation to FIG. 2.

The object may then be identified by the client 102 using a variety of different techniques, such as image recognition, optical character recognition, RFID, barcode scanning, and so on. For instance, the keys 226 may include an indicator (e.g., a barcode) that is readable by the surface detection module 212. The indicator may then be used by the advertisement targeting module 124 to identify the object, such as to identify that the key 226 corresponds to a particular brand of automobile. A variety of other instances are also contemplated, such as through image recognition to identify a particular logo of the brand of automobile that corresponds to the key 226.

An advertisement is located that corresponds to the identified object (block 304). The advertisement targeting module 124, for instance, may locate advertisements that correspond to the brand of automobile that corresponds to the key 226, such as for advertisements of a car manufacturer that makes the particular brand of automobile and/or competitors of that car manufacturer.

The advertisement may then be output (block 306). For instance, the advertisement may be displayed using at least a portion of the surface 120 of the client 102 (block 308), an example of which is shown by the car 228 being displayed on the surface 120 of the client 102 of FIG. 2. In another instance, the client 102 may cause the advertisement to be displayed by another client located proximally to the client 102 that performs the identification (block 310), an example of which is shown by the other client 106 outputting advertisement 230 in FIG. 2.

Thus, the client 102 having the surface 120 may target advertisements in a variety of ways. For example, the ad targeting may be based on an object currently placed on the surface 120 of the client 102. For instance, a guest may come over to watch a sporting event with some friends and place a keychain on the surface 120. The client 102 may recognize that the one or more of the keys correspond to a particular car and cause the other client 106 to output an advertisement of a newer model of that car.

In another example, the client 102 may take into account a number of objects that are currently placed on the surface 120 of the client 102. For instance, a number of "smart" phones may be placed on a surface 120, which may be used as a basis to output one or more advertisements related to smart phones. The client 102 may also utilize one or more heuristic techniques to base output of advertisements on objects that were placed on the surface 120 of the client 102 over a period of time, further discussion of which may be found in relation to the following procedure.

Figure 4:
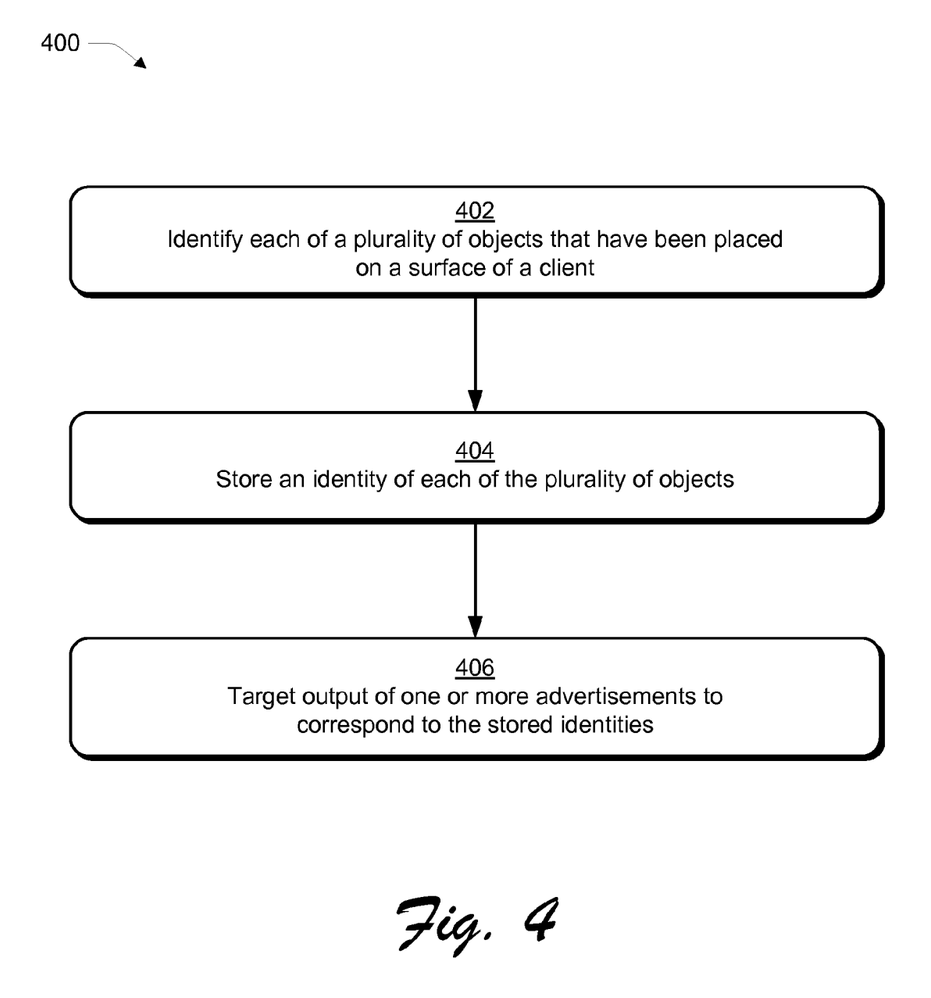
FIG. 4 is a flow diagram depicting a procedure in an example implementation in which stored identities of a plurality of objects over a period of time are used as a basis to target advertisements.

FIG. 4 depicts a procedure 400 in an example implementation in which stored identities of a plurality of objects over a period of time is used to target advertisements. Each of a plurality of objects is identified that have been placed on a surface of a client (block 402). For example, the client 102 may be configured as a coffee table and placed before a television in a user's household. Over a period of time, a variety of different objects may be placed on a surface 120 of the client 102.

Accordingly, each of the plurality of objects may be identified using one or more of the techniques previously described in relation to FIGS. 1-3. An identity of each of the plurality of objects may then be stored (block 404), such as in memory 204 of the client 102, remotely over a network 104 (e.g., at a website), and so on.

Output of one or more advertisements may then be targeted to correspond to the stored identities (block 406). For example, the advertisement targeting module 124 may identify that a variety of different "baby related" items (e.g., a pacifier and bottle) have been placed on the surface 120 and accordingly target output of advertisements to have baby-related themes. The advertisement targeting module 124 may employ a variety of different techniques to determine which ads should be output, such as a weighting that is based on a number of objects and/or an amount of time objects have spent on the surface 120. Thus, the advertisement targeting module 124 may target advertisements based on what is currently placed on the surface 120 of the client 102 and/or objects that have been placed on the surface 120 of the client 102 in the past.

Figure 5:
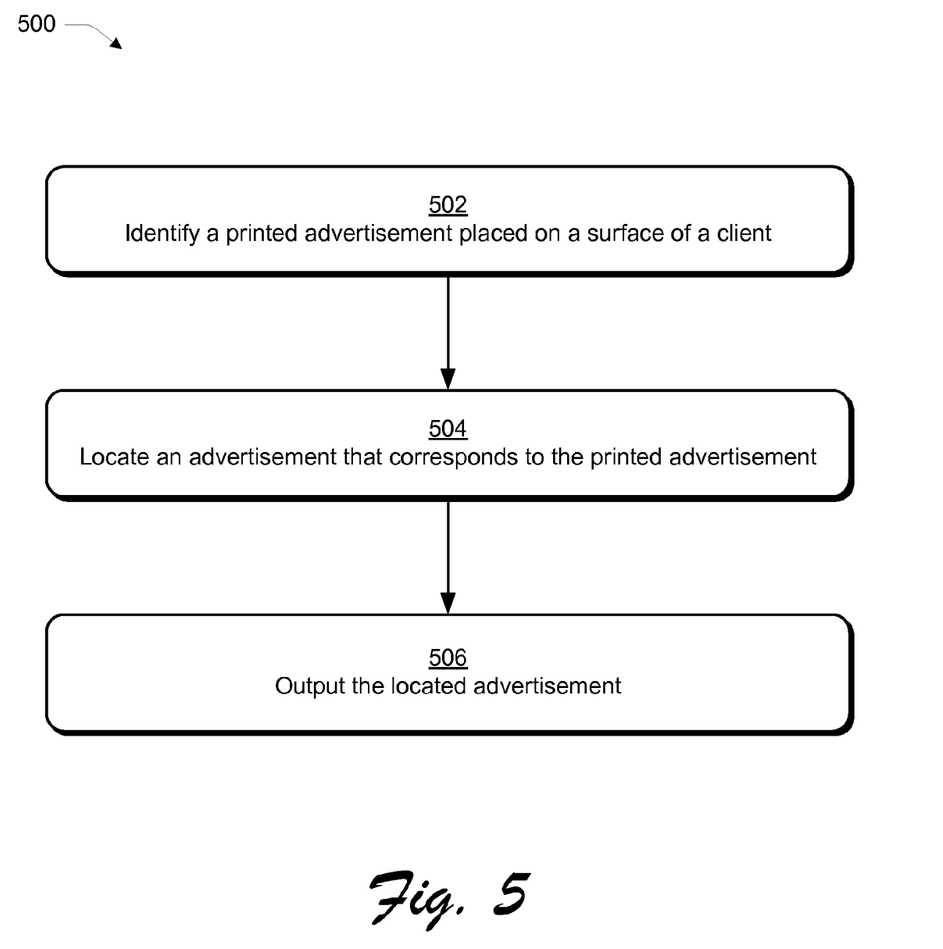
FIG. 5 is a flow diagram depicting a procedure in an example implementation in which a printed advertisement is linked with other advertisements.

FIG. 5 depicts a procedure 500 in an example implementation in which printed advertisements are linked with other advertisements. A printed advertisement is identified that is placed on a surface of a client (block 502). For example, the printed advertisement may include text that invites a user to "learn more about" the product or service by placing the printed ad on the surface 120 of the client 102. The printed advertisement may include an "ad code" that is used to identify the particular advertisement. A variety of other examples are also contemplated, such as through OCR or other image recognition techniques to identify the subject matter of the printed advertisement, an RFID tag, and so on.

An advertisement is located that corresponds to the printed advertisement (block 504). For example, the advertisement targeting module 124 may access a particular website identified in the printed advertisement, use the ad code to look up a network address of the advertisement, and so on. The located advertisement may then be output (block 506), such as by using the surface 120 of the client 102 and/or another client 106. In this way, a user is able to leverage the client 102 to obtain additional information of interest. A variety of other examples of advertisement linking are also contemplated without departing from the spirit and scope thereof.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
determining, by a client, an identity for an object placed on a scanning surface of the client by scanning the object using the scanning surface of the client;
locating an advertisement that corresponds to the identity for the object; and
displaying the advertisement on the scanning surface.

2. A method as described in claim 1, wherein:
the client has a form factor of a table; and
the scanning surface is included as part of a table top of the client.

3. A method as described in claim 1, wherein the determining is performed through image recognition performed using one or more cameras of the client that are located below the scanning surface of the client.

4. A method as described in claim 1, wherein the determining is performed, at least in part, through barcode scanning or optical character recognition of at least a portion of the object.

5. A method as described in claim 1, wherein the determining is performed, at least in part, using one or more radio frequency identification techniques.

6. A method as described in claim 1, wherein the locating is performed to select from one or more advertisements that are stored locally on the client.

7. A method as described in claim 1, wherein the locating is performed to select from one or more advertisements that are stored remotely from the client over a network.

8. A method as described in claim 1, wherein the displaying of the advertisement is performed to correspond to an output of television content on another client.

9. A method as described in claim 1, wherein the displaying of the advertisement is performed to correspond to an output of one or more webpages.

10. A method as described in claim 1, wherein the displaying is performed to cause another client that is located proximally to the client to display the advertisement.

11. A method as described in claim 10, wherein the other client that is located proximally to the client is configured to display the advertisement in conjunction with television content.

12. A method as described in claim 1, wherein:
the object is a printed advertisement; and
the advertisement is to be output to a television, which is located proximally to the client, to display the advertisement.

13. A method comprising:
identifying each of a plurality of objects that have been placed on a surface of a client by scanning the objects using the surface of the client;
storing an identity of each of the plurality of objects; and
targeting output of one or more advertisements to correspond to the stored identities such that the one or more advertisements are displayed on the surface.

14. A method as described in claim 13, wherein the targeting is performed such that the one or more advertisements are output for display on a television that is connected to the client via a local network connection.

15. A client comprising:
a surface configured to display content; and
one or more modules to:
cause one or more objects that are placed on the surface to be scanned using the surface;

determine an identity for the one or more objects based on the one or more objects being scanned using the surface; and target output of one or more advertisements to correspond to the identified one or more objects such that the one or more advertisements are displayed on the surface.

16. A client as described in claim 15, wherein the surface is included as a part of a housing having a form factor of a table.

17. A client as described in claim 15, wherein the one or more modules are further configured to display a user interface on the surface that is manipulable by a plurality of users concurrently by touching the surface.

18. A client as described in claim 15, wherein the one or more modules include:

a rear-projection system to display the image on the surface;

one or more infrared projectors to project infrared light on the surface;

one or more infrared cameras to capture infrared images of the surface; and a detection module to process the infrared images to detect the one or more objects.

* * * * *